United States Patent [19]

Himmelmann et al.

[11] 3,967,966

[45] July 6, 1976

[54] PHOTOGRAPHIC GELATINE LAYERS WITH IMPROVED PHYSICAL AND PHOTOGRAPHIC PROPERTIES

[75] Inventors: Wolfgang Himmelmann, Opladen; Gerhard Ballé; Fritz Nittel, both of Cologne; Wilhelm Saleck, Schildgen, all of Germany

[73] Assignee: AGFA-Gevaert, A.G., Leverkusen, Germany

[22] Filed: Apr. 17, 1973

[21] Appl. No.: 351,850

[30] Foreign Application Priority Data

Apr. 19, 1972 Germany............................ 2219004

[52] U.S. Cl.................................. 96/114; 96/114.4; 96/114.7; 106/125; 260/79.3 MU
[51] Int. Cl.$^2$.......................................................... G03C 1/72
[58] Field of Search................ 96/114, 114.7, 114.4; 260/79.3 MU; 106/125, 136

[56] References Cited

UNITED STATES PATENTS

| 3,052,656 | 9/1962 | Groene et al............... 260/79.3 MU |
| 3,061,437 | 10/1962 | Burness et al..................... 96/114.4 |
| 3,313,784 | 4/1967 | Vrancken et al..................... 96/114 |
| 3,607,289 | 9/1971 | Keberle et al..................... 96/114.4 |
| 3,877,944 | 4/1975 | Saleck et al.......................... 96/114 |

Primary Examiner—J. Travis Brown
Attorney, Agent, or Firm—Connolly and Hutz

[57] ABSTRACT

The mechanical properties of gelatin layers for photographic materials are improved by the addition of water-insoluble, elastic copolymers which consist of acrylic acid or methacrylic acid esters (I) which may be mixed with other vinyl and divinyl monomers (II) and which contain comonomers (III) which contain disulfone imidoester or sulfonimidophosphoric acid ester or amide groups.

13 Claims, No Drawings

PHOTOGRAPHIC GELATINE LAYERS WITH IMPROVED PHYSICAL AND PHOTOGRAPHIC PROPERTIES

This invention relates to gelatin layers for photographic materials in which the photographic and mechanical properties of the layers are improved by the addition of copolymers which contain hydrophilic groups.

The substance mainly used in photography as the hydrophilic colloid layer for light-sensitive silver halide emulsions and other auxiliary layers is gelatin. The physical properties of the gelatin layer, e.g. its fragility, elasticity and strength at low temperatures, depend largely on the humidity of the atmosphere. If a gelatin layer dries out severely, powerful tensions come into operation which are liable to deform the substrate. Gelatin-containing photographic emulsions which are cast on triacetyl cellulose films tend to break when very dry or if subjected to sudden bending stresses. The fracture is propagated through the preparation and may break the substrate. There have therefore been many attempts to improve the mechanical properties of such layers, even under very dry conditions, by adding plasticizers to the gelatin.

The plasticizers which have been described for this purpose are hygroscopic substances such as alcohols or glycerol but these substances impart a moist handle to the layers or may render the gelatin layers even more fragile, especially under conditions of low atmospheric moisture. Amides of carboxylic acids or various copolymers, especially of acrylic acid esters, acrylonitrile or acrylamide, have been suggested for the same purpose. All these products, however, have various disadvantages. The main disadvantage is that the low molecular weight additives are liable to be eluted during the photographic process so that the plasticizing effect is lost, or they may make the layers cloudy so that the photographic properties are impaired. This occurs especially in the case of higher molecular weight, water-insoluble plasticizers.

High molecular weight polyether polyurethanes in which the polyurethane chain contains tertiary nitrogen atoms which are converted into tetravalent ammonium nitrogen atoms by reaction with alkylating agents or organic or inorganic acids, have become important plasticizers for gelatin. Owing to their chemical structure, these cationic polyurethanes have alkaline properties which show mainly as harmful effects on the photographic layers due to the retention of developer and in the incompatibility with the usual copolymer dispersions of butyl acrylate, acrylonitrile, acrylamide and other comonomers previously used as plasticizers. These usual polymer dispersions are in most cases prepared with anionic wetting agents.

Another disadvantage is found in photographic colour emulsions. As is well known, the diffusion resistance of the water-soluble colour component molecule is achieved by the incorporation of long fatty residues ($C_{12}$–$C_{18}$) and the water-solubility is achieved by the presence of sulfonic acid and carboxylic acid groups. These colour components therefore acquire the character of anionic wetting agents and, are not compatible in aqueous solution with e.g. cationic polyether urethanes because they are liable to precipitate each other.

The copolymers of acrylic acid esters mentioned above have been known for some time as plasticizers for gelatin. Hydrosols of such copolymers have, however, the disadvantage that, although they improve the mechanical properties when added to gelatin, the photographic properties generally suffer. Owing to their presence in the layers, the rates of development and of fixing are considerably reduced. There have been many attempts to overcome these disadvantages, as by hydrating additives such as silica sols and other surface active pigments.

It is an object of this invention to provide copolymer dispersions which have a plasticizing effect on gelatin layers and particularly on photographic gelatin layers without the above mentioned disadvantages of known plasticizers.

It has now been found that water-insoluble, elastic copolymers which consist of acrylic acid or methacrylic acid esters (I), which monomers may be mixed with other vinyl and divinyl monomers (II) and which contain comonomers (III) having disulfonimide or sulfonimidophosphoric acid ester or amide groups and which render the substance hydrophilic, are suitable plasticizers for gelatin and photographic layers which contain gelatin.

The comonomers (III) according to the invention which render the substances hydrophilic correspond to the following formulae

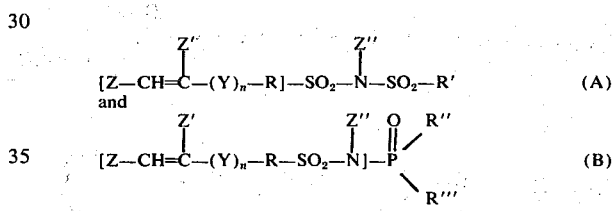

in which

R represents a divalent, hydrocarbon group containing 1–18 carbon atoms, which may be substituted e.g. an alkylene, cycloalkylene, arylene or substituted arylene group, R' represents a monovalent, hydrocarbon group containing 1–18 carbon atoms, which may be substituted, e.g. an alkyl, cycloalkyl, aryl, substituted aryl or aralkyl group or the group represented in square brackets in Formula A, R'' = one of the groups —OR'''', —NH—R'''' or —N(R'''')$_2$, R''' = R'' or the group shown in square brackets in Formula B, R'''' = a monovalent, hydrocarbon group containing 1 to 18 carbon atoms, which may be substituted, e.g. an alkyl, cycloalkyl, aryl, substituted alkyl or aralkyl group, Y = a divalent bridge having the structure

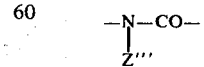

—O—CO— or —CO—, in which the carbonyl group is in each case attached to the double bonded carbon,
$n = 0$ or 1,
Z = hydrogen, a $C_1$ alkyl group or the carboxyl group, and Z', Z'', Z''' = hydrogen or $C_1$ alkyl groups.
The following compounds are typical examples of suitable comonomers of the above general formulae which have a hydrophilic effect:
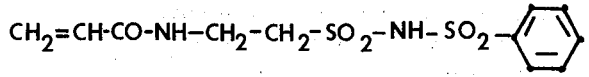
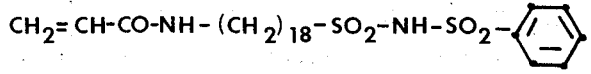
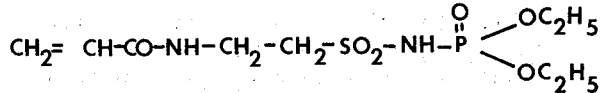
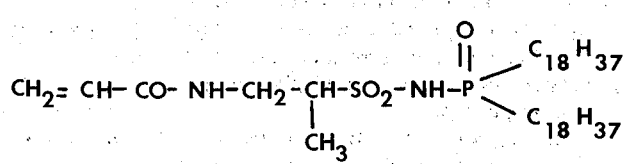
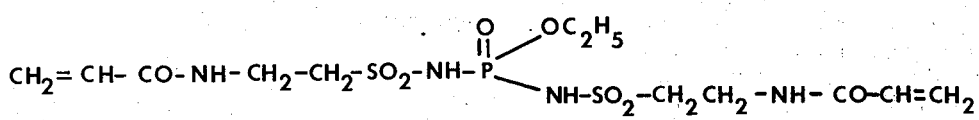
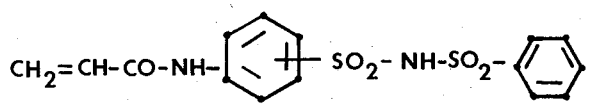
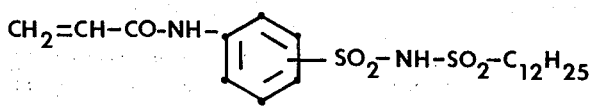
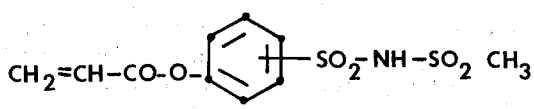
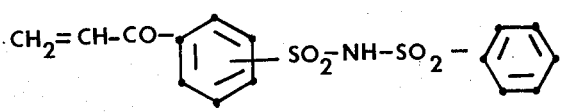
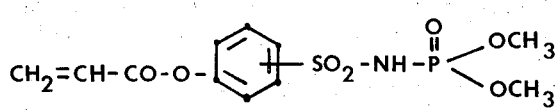
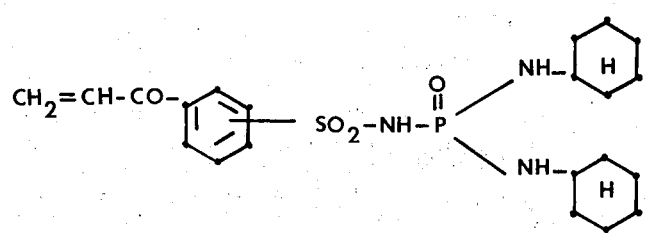

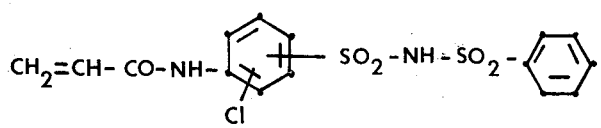

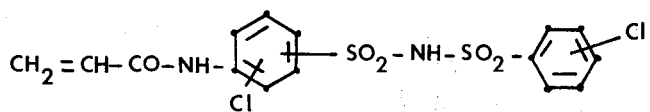

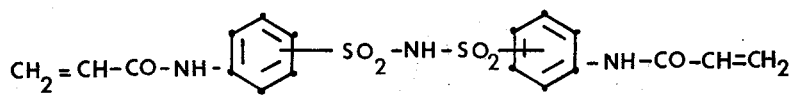

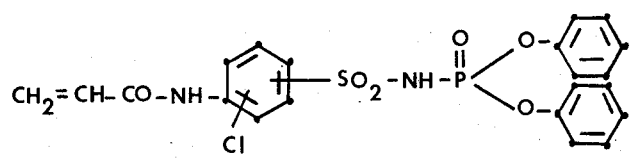

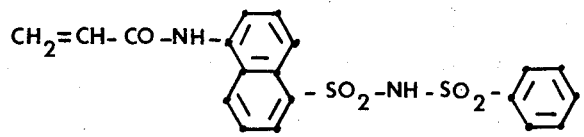

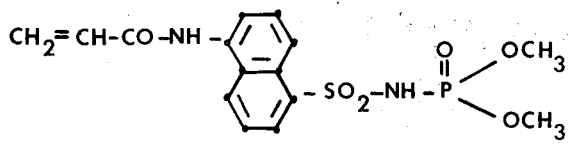

and the corresponding methacrylic acid derivatives, and:

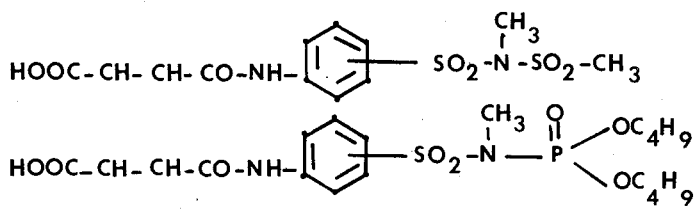

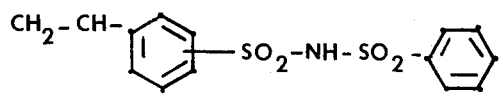

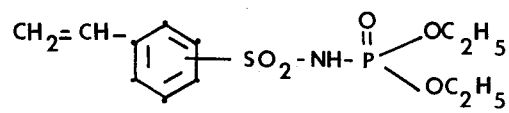

The disulfone imides according to Formula A are prepared by acylating sulfonic acid amides with sulfonic acid chlorides in an alkaline medium. A description of the reaction with literature references may be found in Houben-Weyl, Methoden der organischen Chemie, Vol. IX, pages 636, 637 and in German Pat. No. 757,262, U.S. Pat. No. 2,374,934 and German Auslegeschrift No. 1,249,259.

The preparation of the compound

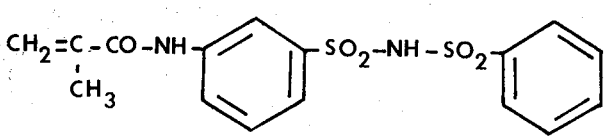

is described in Example 1 of U.S. Pat. No. 3,052,656.

sulfonamidophosphoric acid esters of Formula B are prepared from sulfonic acid amides in accordance with the following reaction scheme:

added. Apart from gelatin, the binder for the layer may also contain other hydrophilic colloids such as polyvinylpyrrolidone, polyvinyl alcohol, silicic acid sol and other proteins.

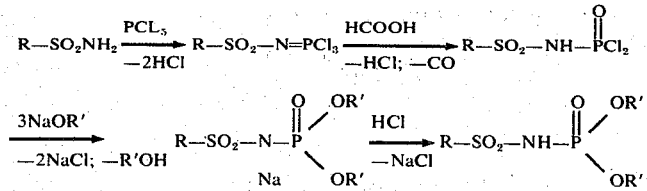

A description of this reaction, with literature references, may be found in Houben-Weyl, Methoden der organischen Chemie, Vol. XII, part II, pages 858–859 and 529–534. The acylation of aminosubstituted sulfonamidophosphoric acid esters with unsaturated carboxylic acid derivatives is carried out by a process analogous to the process described in German Auslegeschrift No. 1,249,259.

The copolymers used according to the invention not only have good compatibility with gelatin but also a good plasticizing action and do not impair the sensitivity or rate of development and fixing, nor do they impair the effectiveness of the sensitizers in the colour layer or the distribution and absorption. Moreover, they are readily compatible with anionic and neutral wetting agents.

The copolymers consist of at least 70%, preferably at least 80%, of (I) one or more acrylic or methacrylic acid esters or mixtures of these esters with (II) other copolymerisable monomeric acrylic, vinyl or divinyl compounds, and up to 30%, preferably up to 20%, of the hydrophilic monomers (III) mentioned above.

Suitable monomers of group (I) are acrylic acid alkyl esters containing 1–18 carbon atoms in the alkyl group and methacrylic acid alkyl esters containing 4 to 18 carbon atoms in the alkyl group, e.g. methyl, ethyl, isopropyl, n-butyl or isooctylacrylate and n-butyl, n-octyl or n-dodecylmethacrylate. The copolymerisable monomers of group (II) used are amides and nitriles of acrylic or methacrylic acid, vinyl esters of saturated fatty acids, e.g. vinyl acetate, vinyl propionate or vinyl stearate, N-vinylimides and lactams, e.g. N-vinyl succinimide or N-vinylpyrrolidone, vinyl ethers such as vinyl ether or vinyl isobutyl ether, olefines, e.g. ethylene, propylene, 1-butene, isobutene, styrene or vinyl toluene, or 1-3-diolefines, e.g. butadiene, isoprene or chloroprene.

The quantity of alkyl acrylate or methacrylate (I) and quantity of additional monomers (II) used such as acrylamide, vinyl pyrrolidone or acrylonitrile are always chosen so that the copolymers according to the invention will have a glass transition temperature below 10°C. The character of the copolymers can be varied within certain limits by the additional monomers (II).

The copolymers have average molecular weights of 5000 to 500,000 and the size of the particles in the dispersions should be below 1 $\mu$ and preferably in the region of 0.1 $\mu$. The copolymers are insoluble in water and can easily be dispersed or added to gelatin as hydrosols.

The quantity of copolymer necessary for improving the properties of the layer may vary within wide limits. 5 to 100% by weight, based on the quantity of gelatin, but preferably 20 to 50% by weight are generally The preparation of the water-insoluble copolymers is not a subject of this invention. It is carried out in known manner by the process of emulsion polymerisation using one or more surface active substances as emulsifiers. Anion active emulsifiers are suitable, e.g. alkali metal or ammonium salts of long chain mono- or polycarboxylic acids such as fatty acids or resinic acids, particularly those containing 10 to 20 carbon atoms, semi-esters of saturated or unsaturated dicarboxylic acids with long chain monohydric alcohols, salts of acid alkylsulfuric acid esters, alkali metal salts of long chain alkyl sulfonic acids and alkyl aryl sulfonic acids, salts of sulfonated oils or salts of fatty acid condensation products with hydroxy or aminoalkyl carboxylic acids or sulfonic acids, salts of sulfonated ethylene oxide adducts and many others. Non-ionic emulsifiers are also suitable, e.g. reaction products of phenols and alkylphenols with 5 to 50 mols of ethylene oxide or reaction products of fatty alcohols with alkylene oxides. Anionic emulsifiers are preferred. They are used in quantities of 1 to 20% by weight, based on the monomers.

Polymerisation may be initiated by means of inorganic per-compounds such as potassium or ammonium persulphate, hydrogen peroxide, percarbonates or perborates or organic peroxides such as acyl peroxides, for example benzoyl peroxide, lauroyl peroxide, alkyl peroxides such as di-tert.-butyl peroxide, alkyl hydroperoxides such as tertiary butyl hydroperoxide, cumene hydroperoxide or p-menthane hydroperoxide. The inorganic or organic per-compounds are advantageously used in combination with reducing agents by the known methods of redox polymerisation. Suitable reducing agents are, for example, alkali metal or ammonium bisulfites, sodium formaldehyde-sulfoxylate, triethanolamine or tetraethylene pentamine.

The catalysts may be used in the usual quantities of 0.05 to 10%, based on the quantity of monomers used.

The polymerisation temperatures depend on the catalyst combinations used and are preferably in the region of 0° to 80°C.

The usual molecular weight regulators such as long chain alkyl mercaptans, diisopropylxanthate disulfide, nitro compounds and the like may be used in the polymerisation process to regulate the molecular weight.

Polymerisation may be carried out by dissolving the hydrophilic comonomer in water to which some alkali metal hydroxide solution, soda or alkali metal bicarbonate may be added, adjusting the solution to a slight acid or up to neutral pH, adding a portion of this solution and the corresponding amount of the other monomers to an aqueous solution of the emulsifier in a reaction vessel which has been flushed with nitrogen, starting the polymerisation by the addition of the initiator and then successively adding the aqueous solution and the remainder of the monomers.

POLYMER I

A hydrosol which was obtained by copolymerisation in emulsion of
  95% of butyl acrylate and
  5% of the compound

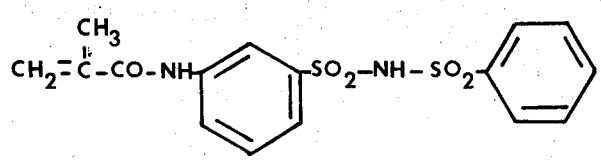

POLYMER II

A hydrosol which was obtained by copolymerisation in emulsion of
  90% of butyl acrylate and
  10% of the compound

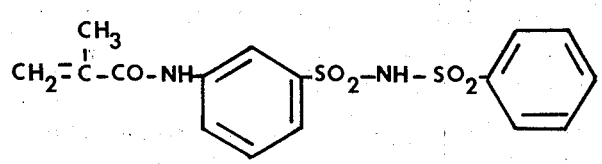

POLYMER III

A hydrosol which was obtained by copolymerisation in emulsion of
  47.5% butyl acrylate,
  47.5% of ethyl acrylate and
  5% of the compound

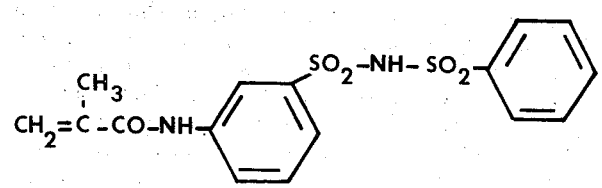

POLYMER IV

A hydrosol which was obtained by polymerisation in emulsion of
  95% of butyl acrylate and
  5% of the compound

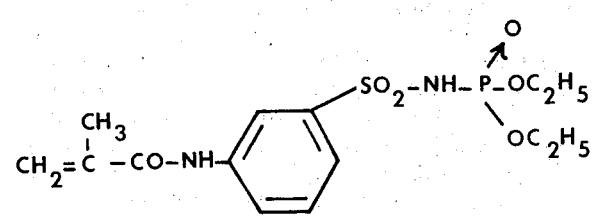

POLYMER V

Hydrosol, which was obtained by polymerisation in emulsion of
  80% of butyl acrylate,
  10% of acrylamide and
  10% of the compound

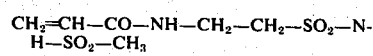

$$CH_2=CH-CO-NH-CH_2-CH_2-SO_2-NH-SO_2-CH_3$$

POLYMER VI

Hydrosol, which was obtained by polymerisation in emulsion of
  80% of butyl acrylate,
  10% of acrylonitrile and
  10% of the compound

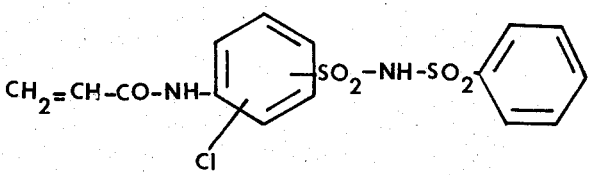

POLYMER VII

Hydrosol, which was obtained by polymerisation in emulsion of
  85% of butyl acrylate,
  5% of N-vinylpyrrolidone and
  10% of the compound

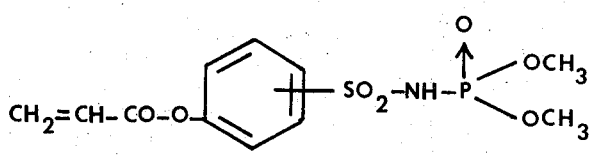

POLYMER VIII

Hydrosol, which was obtained by polymerisation in emulsion of
  85% of ethyl acrylate,
  5% of acrylonitrile and
  10% of the compound

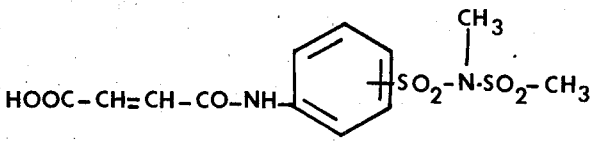

POLYMER IX

Hydrosol, which was obtained by polymerisation in emulsion of
  80% of ethyl acrylate,
  5% of acrylamide and
  15% of the compound

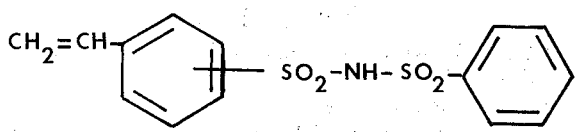

The addition of the polymers according to the invention may be carried out at various stages, for example an aqueous dispersion of the photographic silver halide in a hydrophilic colloid, preferably gelatin, may be mixed with an aqueous dispersion of the water-insoluble polymer. It is also possible, and in many cases necessary, to precipitate the silver halide in a mixture of the polymer hydrosol and hydrophilic colloid. If the polymer hydrosol is added after precipitation of the silver halide, it may be added before, during or after the final digestion. Other hydrophilic colloids such as water-soluble vinyl polymers, polysaccharides, such as cellulose derivatives, proteins, polyacrylamides, polyvinyl pyrrolidones, etc. may, of course, also be added to the gelatin in addition.

The emulsion layers may also contain the usual additives: Stabilizers such as triazaindolizines, spectral sensitizers, sensitizing compounds, light absorbing dyes and wetting agents. Colour photographic layers contain either water-soluble colour couplers which contain a fatty residue and react with oxidizing colour developer, or water insoluble dispersed colour couplers.

EXAMPLE 1

30% of polymers I–IV, based on the quantity of gelatin used, are added in each case as hydrosols with vigorous stirring to separate parts of a mixture of 1 l of a photographic emulsion which contains
35 g of silver halide and
80 g of gelatin.

The hydrosol becomes completely uniformly distributed in the mixture.

24 g of 1-hydroxy-4-sulfo-2-naphthoic acid heptodecylamide are then added as colour component. The plasticizer and colour component need not necessarily be added in this sequence. The individual mixtures are then cast on a prepared support layer of cellulose triacetate after the addition of the usual casting additive such as hardeners, wetting agents and development accelerators, and the layers obtained are dried at room temperature. The thickness of the layers is in each case 18 $\mu$. Sample strips 1.5 cm in width and 30 cm in length are cut out of the webs of film. After colour processing for negative cine films according to Final Fiat Report 943, page 85, the strips are exposed for 48 hours to an atmosphere of 30% relative humidity at 23°C and 50% relative humidity at 23°C. The fragility of the film strips is determined by the test method described below.

The test is in each case carried out under the atmospheric conditions specified below.

The apparatus consists of numerous measuring cells. Each measuring cell consists basically of four rotatable deflecting rollers arranged at the corners of a rectangle 70 × 75 mm. Sammple strips of film 300 mm in length and 15 mm in width are placed round these rollers in the form of a continuous loop with the emulsion surface facing outwards.

The two upper rollers of each measuring cell are the driving rollers. The two lower rollers have a smaller diameter (5 mm) and are mounted in pairs on a bracket which can be moved vertically and which is loaded with a weight of 1.5 kg to tighten the strips. The number of rotations of each sample strip is indicated on a counter. When the sample breaks, the bracket of the measuring cell drops down and switches off the counting mechanism. The number of rotations is an indication of the mechanical quality of the film. The higher this number, the better is the mechanical quality of the film. The values indicated are average values obtained from 10 measurements. Only films of excellent quality reach a rotation number above 1000. The results of the fragility tests are summarized in the following Table:

Table I

| Additive | Number of rotations at 23°C 30% relative humidity | 23°C 50% relative humidity |
|---|---|---|
| 0% | 20 | 30 |
| 30% Polymer I | 1100 | 1300 |
| 30% Polymer II | 620 | 1350 |
| 30% Polymer III | 300 | 450 |
| 30% Polymer IV | 230 | 1250 |

The additives reduce the fragility at 30% relative humidity of the layers which contain colour component. The fragility of the layers not containing additive is much higher.

The layers are clear and show no signs of exudation on the surface. When developed, the individually cast colour films show no photographic disadvantages such as reduced sensitivity or increased fogging.

EXAMPLE 2

50% of polymer IV, based on the quantity of gelatin, are added to a solution of a photographic gelatin in water which contains 0.3% of formalin in addition to 0.5% of the filter dye tartrazine. The casting solution is poured on to a level, tempered Plexiglas plate and dried under dust-free conditions. The foil produced in this way has a thickness of about 80 $\mu$. The filter foil is dried for 2 hours at 50°C and kept for a few minutes in an atmosphere of 50% relative humidity. The foil is substantially more resistant to mechanical stresses such as bending and folding than a gelatin foil without additive, which splinters very easily. The filter layer obtained is clear and shows no cloudiness.

EXAMPLE 3

26 g of polymer IV per kg are added to a highly sensitive gelatin-silver bromide-silver iodide emulsion (6% AgI and 94% AgBr) which contains about 65 g of gelatin per kg. The emulsion is thoroughly stirred during the addition of the polymer. Before the solution is cast, a hardener and an anionic wetting agent are added. The solution is then cast on a prepared support layer of triacetyl cellulose. After drying, strips 10 cm in length and 5 cm in width are cut out and the samples are dried in a drying cupboard at 50°C for one hour. Comparison samples containing no additive roll up more severely than those which contain additive. The adherence of the layer to its substrate is not reduced. The film samples obtained after exposure, development and fixing are free from fogging and have the normal sensitivity corresponding to their composition.

The development and fixing times are comparable with those required for the sample without additive. A film which has the same photographic properties but lies flatter and is less brittle can therefore be obtained in this way.

A developer of the following composition was used:

| | | |
|---|---|---|
| Metal | 1.1 | g |
| Sodium sulfite | 13 | g |
| Hydroquinone | 1.79 | g |
| Soda sicc. | 4.57 | g |
| Potassium bromide | 1.64 | g |
| Water up to | 1 liter. | |

The fixing bath has the usual composition.

EXAMPLE 4

The preparation of a concentrated dispersion of plasticizer in gelatin is described below.

In order to be able to use the polymers according to the invention in a finely dispersed form in the photographic emulsions, preliminary dispersion is carried out using a high speed stirrer and the concentrated stock emulsion which is stable in storage is introduced into the photographic emulsion.

5.75 kg of a 35% aqueous dispersion of polymer I are stirred into a solution of 10.0 liters of 10% gelatin and 1.5 liters of 10% saponin solution with vigorous stirring (Kotthoff mixing apparatus MS2CAA). The aqueous dispersion is stirred into the solution by introducing the plasticizer dispersion through a tube close to the rotor of the mixer. When solidified, the emulsion can be stored in a refrigerator without undergoing any change and may be added to any casting solution for any photographic layers. Some examples are given below.

a. 350 g of the stock emulsion described above are added to 1 kg of a photographic emulsion which has a gelatin concentration of 8% and contains 3(p-stearoyl-aminobenzoylacetamino)-isophthalic acid as yellow coupler.

b. 350 g of the stock emulsion described above are added to 1 kg of a photographic emulsion which has a gelatin concentration of 8% and contains 1-(3'-sulfo-4'-phenoxy)phenyl-3-heptadecyl-pyrazolone-(5) as magenta coupler.

c. 350 g of the stock emulsion described above are added to 1 kg of a photographic emulsion which has a gelatin concentration of 8% and contains 1-hydroxy-4-sulpho-2-naphthoic acid octadecylamide as cyan coupler.

d. 350 g of the stock emulsion described above are added to 1 kg of an 8% protective gelatin layer.

e. 350 g of the stock emulsion described above are added to 1 kg of a black-and-white photographic emulsion.

f. 430 g of the stock emulsion described above are added to 1 kg of a 10% gelatin solution which is then stirred into 1 kg of a 50% aqueous baryta paste. The mixture is used for treating paper substrates.

The above casting solutions (a) to (f) are applied to paper substrates and the layers obtained in this way are dried.

Layers with considerably reduced fragility are obtained. This effect is particularly marked at low relative humidities. Sensitivity, fogging, gradation, colour brilliance, etc. are not affected by addition of the compounds according to the invention.

In the case of films, the fragility is determined by the method indicated in Example 1. In the case of photographic paper, a different method must be used on account of the inelasticity of the substrate. Paper samples stored at 20% relative humidity for 3 days are successively pulled over rollers of different diameters (60 mm to 10 mm). The fragility is expressed in terms of the diameter in mm at which the emulsion or developed layer breaks. The smaller this number, the greater is the pliability of the layer and hence the plasticizing effect of a substance. The test was carried out on a processed sheet of black and white photographic paper and on an unprocessed material.

A colour photographic material prepared according to Examples 4(a) to (f) using polymer I had the following fragility values compared with those of a material without plasticizer:

Table II

| | Containing plasticizer | | Without plasticizer |
|---|---|---|---|
| | Polymer I | Polymer II | |
| Processed white sheet | 10 mm | 15 mm | 30 mm |
| Processed black sheet | 15 mm | 15 mm | 35 mm |
| Unprocessed material | 15 mm | 20 mm | 40 mm |

The same results are obtained when polymer II is used instead of polymer I, in Example 4.

In the following examples, the copolymer was added at the stage of preparing the emulsion, specifically before precipitation of the silver halide in Example 5 and after precipitation and during after-ripening of the emulsion in Example 6. Excellent photographic results are obtained in both cases. The layers are in all cases less fragile if they contain the compounds according to the invention.

EXAMPLE 5

Emulsion I

A solution of 440 g of potassium bromide, 36 g of potassium iodide and 100 g of gelatin in 6 liters of water is introduced into the reaction vessel. After dissolving the components at 40°C, the solution is heated to 65°C. A solution of 600 g of silver nitrate in 7 liters of water which is at the same temperature as the solution in the reaction vessel is then run in over a period of 60 minutes.

The resulting emulsion is cooled to 30°C and flocculated by the addition of a concentrated ammonium sulfate solution. The flocculate is left to settle, decanted and washed several times with water. The washed flocculate is taken up with a solution of 700 g of gelatin in 7 liters of water. This is then adjusted to pH 6.5 and $p_{Ag}$ 8.9 and the viscosity is adjusted to about 10 cp.

After addition of the usual sulphur compounds and gold salts, the material is then chemically ripened to maximum sensitivity at about 52°C.

Emulsion II

The emulsion is prepared in the same way as emulsion I except that 100 ml of 40% aqueous emulsion of polymer I are added to the solution in the reaction vessel and the quantity of water originally introduced is reduced accordingly.

Emulsion III

This emulsion is prepared basically in the same way as Emulsion II but instead of the polymer I, 150 ml of a 30% aqueous dispersion of polymer II are used.

The three emulsions are made ready for casting by adding 10 ml of a 10% aqueous formaldehyde solution as hardener, 12 ml of a 7.5% aqueous saponin solution as wetting agent and 20 ml of a 1% methanolic solution of 4-hydroxy-6-methyl-1,3,3a,7-tetrazaindene as stabilizer. The samples of casting solution are then poured on a support layer of cellulose triacetate.

The layers are exposed in a conventional sensitometer behind a step wedge. The exposed samples are developed for 7 minutes in a bath of the following composition at 20°C, and in a parallel experiment for 16 minutes:

| | |
|---|---|
| Sodium sulfite sicc. | 70.0 g |
| Borax | 7.0 g |
| Hydroquinone | 3.5 g |
| p-monomethylaminophenol | 3.5 g |
| Sodium citrate | 7.0 g |
| Potassium bromide | 0.4 g |
| Water up to | 1 liter |

The film is then fixed with a sodium thiosulfate solution. The step wedges obtained are assessed sensitometrically. The results are summarized in the following Table:

Table III

| | 7 min. development time | | | 16 min. development time | | |
|---|---|---|---|---|---|---|
| | sensitivity | gama | fog | sensitivity | gama | fog |
| Emulsion I | blank | 0.80 | 0.20 | blank | 0.95 | 0.30 |
| Emulsion II | +0.5° | 0.85 | 0.20 | +1° | 0.95 | 0.30 |
| Emulsion III | +1.5° | 0.85 | 0.18 | +1° | 1.00 | 0.22 |

3° = 1 shutter stop

EXAMPLE 6

An emulsion is prepared as described in Example 5. For after-ripening, the washed flocculate is divided into four parts. For Part A, 2 l of water are introduced into a reaction vessel with 20 g of gelatin and the flocculate is then dissolved. For Part B, 1 liter of water, 120 g of gelatin and 200 ml of a 40% aqueous dispersion of polymer I are added. 155 g of gelatin and 150 ml of a 30% aqueous dispersion of polymer II and 1 liter of water are added to Part C and the flocculate is then dissolved in it. 1 Liter of water, 110 g of gelatin and 300 ml of a 30% aqueous dispersion of polymer II are added to Part D.

Chemical ripening and subsequent processing are carried out as described in the previous example. The results of the sensitometric test are shown in the following Table:

Table IV

| | 7 min. development time | | | 16 min. development time | | |
|---|---|---|---|---|---|---|
| | sensitivity | gama | fog | sensitivity | gama | fog |
| Part A (Comparison) | blank | 0.70 | 0.25 | blank | 1.0 | 0.32 |
| Part B | +0.5° | 0.75 | 0.20 | +0 | 0.95 | 0.28 |
| Part C | +1.0° | 0.70 | 0.18 | +0.5° | 0.95 | 0.27 |
| Part D | +1.5° | 0.75 | 0.17 | +1° | 0.90 | 0.25 |

3° = 1 shutter stop

What we claim is:

1. In a photographic material containing a gelatin layer in which the gelatin is plasticized, the improvement according to which it is plasticized with a substantially water-insoluble compolymer of
   a. at least one $C_1$ to $C_{18}$ alkyl ester of acrylic acid or $C_4$ to $C_{18}$ alkyl ester of methacrylic acid, and
   b. a disulfonimide or sulfonimido-phosphate or sulfonimido-phosphoric acid amide, the copolymer being at least 70% (a) and at least 5% (b), and the copolymer being present in an amount from about 5% to about 100% of the gelatin by weight.

2. The combination of claim 1 in which the polymer is a polymer of (a), (b), and a vinyl or divinyl monomer, and the polymer has a glass transition temperature below 10°C.

3. The combination of claim 1 in which the copolymer has an average weight of from 5000 to 500,000.

4. The combinations of claim 1 wherein the copolymer is present in the gelatin in an amount at least 20% by weight of the gelatin, the second comonomer is a compound of one of the following formulae:

$$[Z-CH=C-(Y)_n-R]-SO_2-N-SO_2-R^1 \quad (A)$$
$$\text{with } Z', Z''$$

or $$[Z-CH=C-(Y)_n-R-SO_2-N]-P\begin{matrix}O & R^2 \\ \| & \diagup \\ & \diagdown R^3\end{matrix} \quad (B)$$

in which
R represents a divalent hydrocarbon group,
$R^1$ represents a monovalent hydrocarbon group, or the group represented in square brackets in formula (A),
$R^2$ represents one of the groups $-OR^4$, $-NH-R^4$ or $-N(R^4)_2$,
$R^3$ represents the group shown in square brackets in formula (B), or $R^2$,
$R^4$ represents a monovalent hydrocarbon group,
Y represents a divalent bridge having the structure $$-N-CO-,$$
$$\quad | $$
$$\quad Z'''$$

$-O-CO-$ or $-CO-$, in which the carbonyl group is in each case attached to the carbon of the double bond,
$n = 0$ or 1,
Z represents hydrogen, a methyl or the carboxyl group and
Z', Z'', Z''' represents hydrogen or methyl.

5. The combination of claim 1 in which the ester (a) is methyl, ethyl, isopropyl, n-butyl or iso-octyl acrylate or n-butyl, n-octyl or n-dodecylmethacrylate.

6. The combination of claim 2 in which the vinyl or divinyl monomer is selected from the group consisting of an amide or nitrile of acrylic or methacrylic acid, a vinyl ester of a saturated fatty acid, an N-vinylimide, a lactam, a vinyl ether, an olefine, and a 1,3-diolefine.

7. The combination of claim 3 in which the copolymer has a particle size below 1 μ.

8. The combination of claim 4 in which R represents a $C_1$ to $C_{18}$ hydrocarbon group.

9. The combination of claim 4 in which $R^1$ represents a $C_1$ to $C_{18}$ hydrocarbon group.

10. The combination of claim 4 in which $R^2$ represents a $C_1$ to $C_{18}$ hydrocarbon group.

11. The combination of claim 4 in which $R^4$ represents a $C_1$ to $C_{18}$ hydrocarbon group.

12. The combination of claim 6 in which the vinyl or divinyl monomer is selected from the group consisting of vinyl acetate, vinyl propionate, vinyl stearate, N-vinyl succinimide, N-vinyl pyrrolidone, vinyl ether, vinyl isobutyl ether, ethylene, propylene, 1-butene, isobutene, styrene, vinyl toluene, butadiene, isoprene, and chloroprene.

13. The combination of claim 7 in which the particle size of the copolymer is of the order of 0.1 $\mu$.